J. H. CAVANAGH.
Screen.
No. 200,433
Patented Feb. 19, 1878.
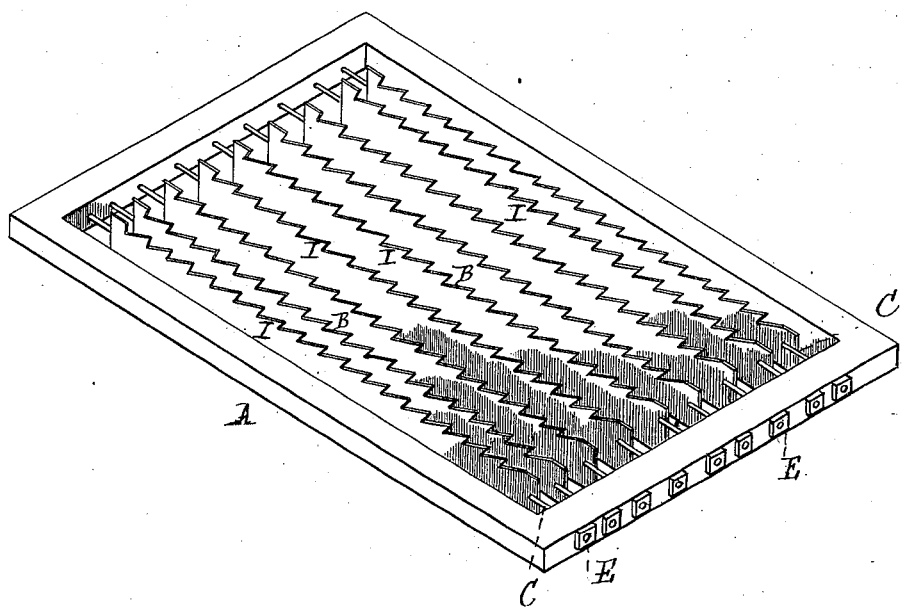
Witnesses
Inventor
James H. Cavanagh
by Dewey & Co
Attys

UNITED STATES PATENT OFFICE.

JAMES H. CAVANAGH, OF SAN FRANCISCO, CALIFORNIA.

IMPROVEMENT IN SCREENS.

Specification forming part of Letters Patent No. 200,433, dated February 19, 1878; application filed October 26, 1877.

*To all whom it may concern:*

Be it known that I, JAMES H. CAVANAGH, of the city and county of San Francisco, and State of California, have invented an Improved Screen; and I do hereby declare the following to be a full, clear, and exact description thereof, reference being had to the accompanying drawing.

The object of my invention is to provide a sieve or screen for separators which will carry the straw, and allow the grain to pass through between the slats, without the possibility of the straw lodging and choking the screen.

My invention consists in the employment of parallel slats or strips, which extend lengthwise of the screen-frame, in a line with the travel of the straw. The screen is constructed without any cross-bars or other intervening obstruction for the straw to lodge against. The slats I place edgewise in the frame, and their upper edges I provide with teeth, all as hereinafter more fully described.

Let A represent the screen-frame. B B B are the parallel slats, which I secure inside of the frame, so that they shall extend from one end rail of the frame to the other. These slats can be made of wood, metal, or other suitable material. Usually I shall make them of sheet metal.

One end of each slat I attach firmly to one end rail of the frame, while its opposite end has a rod, C, projecting from it so as to pass through the opposite end rail. The extremity of each rod C is formed into a screw, and a nut, E, on the outside of the rail is turned upon the screw so as to draw the slats tight. These slats may stand edgewise, or they may be slightly inclined. Usually I shall place them edgewise.

It will be noticed that the slats extend across the entire length of the frame, without any cross-bars or other obstructions between the two end rails.

The upper edges of the slats I provide with raking-teeth I I, similar to saw-teeth.

This screen I mount inside of the separator, so that the straw will pass over the slats from one end to the other, and I impart to it an end shake. Usually I shall mount the inner end on cranked journals, while the outer end, toward which the teeth point, I will operate by an eccentric, so as to give an up and down and rising and falling motion to the screen.

As the straw passes up onto the screen, it will be caught by the teeth and carried forward by the longitudinal and rising motion of the screen. The falling and receding motion then causes the teeth to pass under the straw and take a new hold, so that on the next motion it is carried farther up the screen. This repeated operation keeps the straw traveling at a positive rate of speed, and at the same time shakes it thoroughly, so that the grains will be loosened from the straws, and drop through between the slats upon the screen below.

The teeth are only important for giving a positive travel to the straw. They can be dispensed with if desired, and plain edges used, in which case the absence of any cross-bars would allow the screen to act in a very complete manner.

By the arrangement of longitudinal strips placed parallel with the sides of the frame and shoe, it is impossible for the straw to choke or clog the screen, as any straws which may get lengthwise between the strips will pass readily through, and if they lie across, then they will be carried entirely over the screen.

Having thus described my invention, what I claim, and desire to secure by Letters Patent, is—

The screen-frame A, having the parallel slats B B B attached firmly to one end, and provided with a straining or tightening device at the opposite end, whereby the slats are secured and adjusted in the frame without cross-bars interrupting the spaces between them, substantially as and for the purpose specified.

In witness whereof I have hereunto set my hand and seal.

JAMES H. CAVANAGH. [L. S.]

Witnesses:
FRANK A. BROOKS,
A. H. EVANS.